US011343306B2

(12) United States Patent
Dai et al.

(10) Patent No.: US 11,343,306 B2
(45) Date of Patent: May 24, 2022

(54) METHOD, DEVICE AND SYSTEM FOR DOWNLOADING DATA BLOCK OF RESOURCE FILE

(71) Applicant: WANGSU SCIENCE & TECHNOLOGY CO., LTD., Shanghai (CN)

(72) Inventors: Xinying Dai, Shanghai (CN); Chenlin Lian, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/284,767

(22) PCT Filed: Dec. 7, 2018

(86) PCT No.: PCT/CN2018/119886
§ 371 (c)(1),
(2) Date: Apr. 12, 2021

(87) PCT Pub. No.: WO2020/093504
PCT Pub. Date: May 14, 2020

(65) Prior Publication Data
US 2021/0400107 A1     Dec. 23, 2021

(30) Foreign Application Priority Data
Nov. 7, 2018   (CN) .......................... 201811321407.9

(51) Int. Cl.
*G06F 15/167*  (2006.01)
*H04L 67/06*   (2022.01)
*H04L 67/104*  (2022.01)

(52) U.S. Cl.
CPC ............ *H04L 67/06* (2013.01); *H04L 67/104* (2013.01)

(58) Field of Classification Search
CPC .............................. H04L 67/06; H04L 67/104
(Continued)

(56) References Cited

U.S. PATENT DOCUMENTS 6,337,715 B1 *  1/2002  Inagaki ................ H04N 21/426
                                                      348/553
7,522,536 B2 *  4/2009  Roberts .................. H04L 29/06
                                                      370/252
(Continued)

FOREIGN PATENT DOCUMENTS

CN      101026543 A      8/2007
CN      101494664 A      7/2009
(Continued)

OTHER PUBLICATIONS

The China National Intellectual Property Administration (CNIPA) The China Search Report for 201811321407.9 daed Dec. 27, 2019 19 Pages.
(Continued)

*Primary Examiner* — Alicia Baturay

(57) ABSTRACT

The present disclosure belongs to the field of data transmission, and provides method, device and system for downloading data blocks of resource files. The method includes: when a target peer needs to download a target resource file, the target peer notifies a tracker server of a file size and a URL of the target resource; the tracker server forwards the file size and the URL to super peers preset in a P2P network to notify the super peers to prepare data blocks of the target resource file meeting the file size and the URL; after the super peer is ready, the tracker server recommends the super peer to the target peer in a form of a peer list; furthermore, the target peer downloads the data blocks of the target resource file from the super peer. With technical solutions of
(Continued)

the present disclosure, validity of the resource file downloaded by the target peer may be guaranteed.

20 Claims, 2 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 7,558,797 B2* | 7/2009 | Li | | H04L 67/104 |
| 7,593,333 B2* | 9/2009 | Li | | H04L 12/1854 |
| | | | | 370/232 |
| 7,756,051 B2* | 7/2010 | Rodriguez | | G06Q 20/401 |
| | | | | 370/252 |
| 7,814,146 B2* | 10/2010 | Chavez | | H04L 67/06 |
| | | | | 709/203 |
| 7,920,572 B2* | 4/2011 | Bates | | H04L 67/104 |
| | | | | 370/395.2 |
| 7,996,550 B2* | 8/2011 | Fischer | | H04L 67/108 |
| | | | | 709/231 |
| 8,015,283 B2* | 9/2011 | Seidel | | H04L 67/104 |
| | | | | 709/224 |
| 8,046,426 B2* | 10/2011 | Medard | | H04L 67/1095 |
| | | | | 709/217 |
| 8,122,488 B2* | 2/2012 | Hoch | | G06Q 30/0207 |
| | | | | 726/4 |
| 8,166,186 B2* | 4/2012 | Inokuchi | | H04L 67/101 |
| | | | | 709/230 |
| 8,204,915 B2* | 6/2012 | Dolganow | | G06F 16/1837 |
| | | | | 707/803 |
| 8,301,724 B2* | 10/2012 | Alexander | | G06Q 30/0241 |
| | | | | 709/217 |
| 8,341,283 B2* | 12/2012 | Argawal | | H04L 67/104 |
| | | | | 709/231 |
| 8,516,071 B2* | 8/2013 | Jackson | | H04L 67/1068 |
| | | | | 709/217 |
| 8,600,220 B2* | 12/2013 | Bloch | | H04N 21/23439 |
| | | | | 386/296 |
| 8,838,722 B2* | 9/2014 | Ridges | | H04L 67/1063 |
| | | | | 709/208 |
| 8,838,823 B2* | 9/2014 | Guo | | H04N 21/8456 |
| | | | | 709/231 |
| 8,843,744 B2* | 9/2014 | Sentinelli | | H04L 63/12 |
| | | | | 713/168 |
| 9,106,668 B2* | 8/2015 | Chalouhi | | H04L 67/104 |
| 9,177,120 B2* | 11/2015 | Peled | | G06F 21/10 |
| 9,219,782 B2* | 12/2015 | Burba | | H04L 67/101 |
| 9,298,735 B2* | 3/2016 | Giraudon | | H04L 67/104 |
| 9,413,822 B2* | 8/2016 | Tcha | | H04L 67/1093 |
| 9,432,273 B2* | 8/2016 | Chopra | | H04L 67/104 |
| 9,438,669 B2* | 9/2016 | Kim | | H04N 21/236 |
| 9,628,760 B2* | 4/2017 | Damola | | H04N 21/6543 |
| 10,104,514 B2* | 10/2018 | Drake | | H04L 67/14 |
| 10,110,657 B2* | 10/2018 | Mitic | | H04L 65/4076 |
| 10,225,620 B1* | 3/2019 | Phillips | | H04N 21/64792 |
| 10,250,671 B2* | 4/2019 | Lee | | H04L 67/104 |
| 10,291,681 B2* | 5/2019 | Nair | | H04L 67/02 |
| 10,313,408 B2* | 6/2019 | Phillips | | H04L 65/1083 |
| 10,349,104 B2* | 7/2019 | Phillips | | H04N 21/2385 |
| 10,402,545 B2* | 9/2019 | Gorfein | | G06F 21/10 |
| 10,412,467 B2* | 9/2019 | Love | | H04N 21/2187 |
| 10,498,368 B2* | 12/2019 | Salomons | | H04L 65/4084 |
| 10,506,262 B2* | 12/2019 | Ma | | H04N 21/6125 |
| 10,725,859 B2* | 7/2020 | Bolkhovitin | | G06F 3/0646 |
| 10,761,929 B2* | 9/2020 | Bolkhovitin | | G06F 11/2094 |
| 10,805,161 B2* | 10/2020 | Lockhart | | H04L 41/0889 |
| 11,102,272 B2* | 8/2021 | Dai | | H04L 67/108 |
| 11,115,219 B2* | 9/2021 | Ha | | G06F 16/958 |
| 2004/0107242 A1* | 6/2004 | Vert | | H04L 67/104 |
| | | | | 709/203 |
| 2004/0255003 A1* | 12/2004 | Tecu | | H04L 67/02 |
| | | | | 709/217 |
| 2005/0091167 A1* | 4/2005 | Moore | | H04L 63/14 |
| | | | | 705/57 |
| 2005/0203851 A1* | 9/2005 | King | | H04L 67/1082 |
| | | | | 705/51 |
| 2006/0149806 A1* | 7/2006 | Scott | | H04L 67/06 |
| | | | | 709/201 |
| 2006/0165014 A1* | 7/2006 | Ikeda | | H04L 67/1063 |
| | | | | 370/254 |
| 2006/0212542 A1* | 9/2006 | Fang | | H04L 67/104 |
| | | | | 709/219 |
| 2006/0212584 A1* | 9/2006 | Yu | | G06F 16/9574 |
| | | | | 709/227 |
| 2007/0094279 A1* | 4/2007 | Mittal | | H04L 67/104 |
| 2008/0005195 A1* | 1/2008 | Li | | G06F 16/1837 |
| 2008/0016201 A1* | 1/2008 | Thompson | | H04L 67/1002 |
| | | | | 709/223 |
| 2008/0037527 A1* | 2/2008 | Chan | | H04L 67/104 |
| | | | | 370/353 |
| 2008/0040420 A1* | 2/2008 | Twiss | | H04L 67/108 |
| | | | | 709/203 |
| 2008/0098123 A1* | 4/2008 | Huang | | H04L 67/104 |
| | | | | 709/231 |
| 2008/0133706 A1* | 6/2008 | Chavez | | H04L 67/108 |
| | | | | 709/218 |
| 2008/0288411 A1* | 11/2008 | Copley | | G06F 21/10 |
| | | | | 705/52 |
| 2009/0100128 A1* | 4/2009 | Czechowski, III | | |
| | | | | H04L 67/1076 |
| | | | | 709/203 |
| 2009/0222515 A1* | 9/2009 | Thompson | | H04L 67/104 |
| | | | | 709/203 |
| 2010/0011060 A1* | 1/2010 | Hilterbrand | | H04L 67/108 |
| | | | | 709/204 |
| 2010/0223320 A1* | 9/2010 | Huang | | H04L 67/14 |
| | | | | 709/203 |
| 2010/0235432 A1* | 9/2010 | Trojer | | H04L 67/1089 |
| | | | | 709/203 |
| 2011/0131336 A1* | 6/2011 | Wang | | H04L 67/2814 |
| | | | | 709/228 |
| 2011/0262104 A1* | 10/2011 | Kiyosawa | | G11B 27/10 |
| | | | | 386/241 |
| 2011/0307538 A1* | 12/2011 | Rimac | | H04L 29/08846 |
| | | | | 709/202 |
| 2012/0136725 A1 | 5/2012 | Alexander et al. | | |
| 2013/0198151 A1* | 8/2013 | Sentinelli | | H04L 1/1854 |
| | | | | 707/693 |
| 2013/0226865 A1* | 8/2013 | Munemann | | G06F 3/0482 |
| | | | | 707/609 |
| 2020/0228582 A1* | 7/2020 | Houze | | H04L 65/4069 |

FOREIGN PATENT DOCUMENTS

| | | |
|---|---|---|
| CN | 101764807 A | 6/2010 |
| CN | 101964741 A | 2/2011 |
| CN | 102137150 A | 7/2011 |
| CN | 102542858 A | 7/2012 |
| CN | 102833293 A | 12/2012 |
| CN | 103986747 A | 8/2014 |
| CN | 107181804 A | 9/2017 |
| CN | 107920258 A | 4/2018 |
| CN | 107959704 A | 4/2018 |
| WO | 2008144530 A2 | 11/2008 |
| WO | 2008144530 A3 | 11/2008 |

OTHER PUBLICATIONS

The China National National Intellectual Property Administration (CNIPA) The China Search Report for 201811321407.9 dated Jul. 13, 2020 26 Pages.

(56) References Cited

OTHER PUBLICATIONS

The World Intellectual Property Organization (WIPO) International Search Report for PCT/CN2018/119886 dated Jul. 31, 2019 5 pages.

* cited by examiner

METHOD, DEVICE AND SYSTEM FOR DOWNLOADING DATA BLOCK OF RESOURCE FILE

CROSS-REFERENCES TO RELATED APPLICATIONS

This application is a national phase entry under 35 U.S.C. § 371 of International Application No. PCT/CN2018/119886, filed on Dec. 7, 2018, which claims priority of Chinese patent application No. 201811321407.9, filed with the State Intellectual Property Office of P. R. China on Nov. 7, 2018, the entire contents of all of which are incorporated herein by reference in their entirety.

FIELD

The present disclosure generally relates to the field of data transmission technologies and, more particularly, relates to a method, a device, and a system for downloading data blocks of a resource file.

BACKGROUND

A peer-to-peer (P2P) technology is a communication technology based on a peer-to-peer network for data transmission, and a direct terminal-to-terminal communication mechanism may be established based on a P2P technology. In a peer-to-peer network, each peer may be used as a client terminal, and also as a server for other peers. To reduce a load pressure of a content delivery network (CDN) server and save a CDN traffic cost, data blocks for transmitting a resource file on a basis of a peer-to-peer network have been introduced based on a CDN system.

A CDN service provider may deploy a large number of devices with good performances as super peers in a peer-to-peer network in advance. The super peers may download and store all data blocks of a resource file from a CDN server. In this way, when a resource file needs to be obtained, a terminal may request a peer list from a tracker server while downloading data blocks from the CDN server. The tracker server may feed back peer information of the super peers that store the corresponding resource file to the terminal. The peer information of a peer may include at least an IP address and a port number of the peer. As such, the terminal may establish connections with the super peers and obtain data blocks of the resource file stored at the super peers.

In a process of implementing the present invention, the inventors found that existing technologies may have at least the following problems.

Data blocks of a resource file stored in a CDN server may include a certain amount of invalid data blocks. In addition, due to different caching times, data blocks downloaded through a same link may belong to different resource files due to issues caused by version updating. As such, the data blocks downloaded from a CDN server and a super peer may belong to different resource files. Thus, the downloaded resource file may have low effectiveness.

BRIEF SUMMARY OF THE DISCLOSURE

To solve problems in existing technologies, the present disclosure provides a method, a device, and a system for downloading data blocks of a resource file. Technical solutions of present disclosure are summarized as follows.

The first aspect of the present disclosure provides a method for downloading data blocks of a resource file. The method includes: a target peer receives an instruction of downloading a target resource file, and obtains a standard file size of the target resource file based on a URL of the target resource file; according to the URL and the standard file size of the target resource file, the target peer generates a file-specific identification of the target resource file; the target peer sends a peer list acquisition request carrying the file-specific identification of the target resource file to a tracker server; and according to peer information contained in a peer list fed back by the tracker server, the target peer downloads the target resource file.

Optionally, the obtaining the standard file size of the target resource file based on the URL of the target resource file includes: based on the URL of the target resource file, the target peer obtains an IP address of a target CDN server from a DNS system; according to the IP address, the target peer sends a HEAD request carrying the URL to the target CDN server; and the target peer obtains the standard file size of the target resource file carried in a response message of the target CDN server responding to the HEAD request.

Optionally, the downloading the target resource file includes: according to the standard file size and a preset data block size of the target resource file, the target peer obtains bitmap information of the target resource file; and according to the bitmap information of the target resource file, the target peer downloads data blocks of the target resource file.

Optionally, after the obtaining the bitmap information of the target resource file, the method also includes: according to the bitmap information and the URL of the target resource file, the target peer downloads the data blocks of the target resource file from a CDN system.

The second aspect of the present disclosure provides a method for downloading data blocks of a resource file. The method includes: a tracker server receives a peer list acquisition request, sent by a target peer, carrying a file-specific identification of a target resource file, and establishes a peer list corresponding to the target resource file, where the file-specific identification includes a URL and a standard file size of the target resource file; the tracker server sends the file-specific identification to a plurality of optional super peers that are preset, such that the optional super peers may download a data block set corresponding to the file specific identification; when receiving a resource ready notification sent by one target super peer, the tracker server adds peer information of the target super peer to the peer list; and after a preset duration since receiving the peer list acquisition request, the tracker server sends the peer list to the target peer.

Optionally, after the tracker server receives the peer list acquisition request, sent by the target peer, carrying the file-specific identification of the target resource file, the method also includes: according to the peer list acquisition request, the tracker server determines an IP address of the target peer; and based on the IP address of the target peer, the tracker server determines a plurality of optional super peers that respond to the target peer.

Optionally, after the establishing the peer list corresponding to the target resource file, the method also includes: the tracker server determines a plurality of optional ordinary peers currently storing data blocks of the target resource file; and the tracker server adds peer information of the plurality of optional ordinary peers to the peer list.

Optionally, the peer list includes an ordinary peer list for storing peer information of the ordinary peers and a super peer list for storing peer information of the super peers.

The third aspect of the present disclosure provides a method for downloading data blocks of a resource file. The method includes: a target super peer receives a file-specific identification of a target resource file sent by a tracker server, and determines a URL and a standard file size of the target resource file; the target super peer judges whether a data block set of the target resource file with a total data amount consistent with the standard file size is locally stored; if yes, the target super peer sends a resource ready notification to the tracker server, otherwise the target super peer downloads all data blocks of the target resource file according to the URL and the standard file size; and after downloading all the data blocks, the target super peer sends the resource ready notification to the tracker server.

Optionally, the target super peer judging whether the data block set of the target resource file with the total data amount consistent with the standard file size is locally stored includes: the target super peer judges whether a data block set corresponding to the URL is stored locally; and if yes, the target super peer judges whether the total data amount of the data block set is consistent with the standard file size.

Optionally, the downloading all the data blocks of the target resource file according to the URL and the standard file size includes: the target super peer obtains an IP list corresponding to the URL from a DNS system; and the target super peer downloads all the data blocks of the target resource file that satisfy the standard file size according to IP addresses of a plurality of CDN servers included in the IP list.

Optionally, the target super peer downloading all the data blocks of the target resource file that satisfy the standard file size according to the IP addresses of the plurality of CDN servers included in the IP list includes: the target super peer traverses the IP list and extracts the IP address of each CDN server included in the IP list one by one; the target super peer sends a HEAD request carrying the URL to the CDN server corresponding to the IP address extracted; and when a file size carried in a received response message responding to the HEAD request is consistent with the standard file size, the target super peer downloads all the data blocks of the target resource file from the CDN server that sends the response message.

The fourth aspect of the present disclosure provides a client terminal for downloading data blocks of a resource file. The client terminal is used for: receiving an instruction of downloading a target resource file and obtaining a standard file size of the target resource file based on a URL of the target resource file; according to the URL and the standard file size of the target resource file, generating a file-specific identification of the target resource file; sending a peer list acquisition request carrying the file-specific identification of the target resource file to a tracker server; and according to peer information contained in a peer list fed back by the tracker server, downloading the target resource file.

Optionally, the client terminal is specifically used for: based on the URL of the target resource file, obtaining an IP address of a target CDN server from a DNS system; according to the IP address, sending a HEAD request carrying the URL to the target CDN server; and obtaining a standard file size of the target resource file carried in a response message of the target CDN server responding to the HEAD request.

Optionally, the client terminal is specifically used for: according to the standard file size and a preset data block size of the target resource file, obtaining bitmap information of the target resource file; and according to the bitmap information of the target resource file, downloading data blocks of the target resource file.

Optionally, the client terminal is also used for, according to the bitmap information and the URL of the target resource file, downloading the data blocks of the target resource file from a CDN system.

The fifth aspect of the of the present disclosure provides a tracker server for downloading data blocks of a resource file. The tracker server is used for: receiving a peer list acquisition request, sent by a target peer, carrying a file-specific identification of a target resource file and, and establishing a peer list corresponding to the target resource file, where the file-specific identification includes a URL and a standard file size of the target resource file; sending the file-specific identification to a plurality of optional super peers that are preset, such that the plurality of optional super peers downloads a data block set corresponding to the file specific identification; when receiving a resource ready notification sent by the target super peers, adding peer information of the target super peers to the peer list; and after a preset duration since receiving the peer list acquisition request, sending the peer list to the target peer.

Optionally, the tracker server is also used for: according to the peer list acquisition request, determining an IP address of the target peer; and based on the IP address of the target peer, determining a plurality of optional super peers that respond to the target peer.

Optionally, the tracker server is also used for: determining a plurality of optional ordinary peers currently storing the data blocks of the target resource file; and adding peer information of the plurality of optional ordinary peers to the peer list.

Optionally, the peer list includes an ordinary peer list for storing peer information of the ordinary peers and a super peer list for storing peer information of the super peers.

The sixth aspect of the of the present disclosure provides a super client terminal for downloading data blocks of a resource file. The super client terminal is used for: receiving a file-specific identification of a target resource file sent by a tracker server, and determining a URL and a standard file size of the target resource file; judging whether a data block set of the target resource file with a total data amount consistent with the standard file size is locally stored; if yes, sending a resource ready notification to the tracker server, otherwise downloading all data blocks of the target resource file according to the URL and the standard file size; and after downloading all the data blocks, sending the resource ready notification to the tracker server.

Optionally, the super client terminal is specifically used for: judging whether the data block set corresponding to the URL is stored locally; and if yes, judging whether the total data amount of the data block set is consistent with the standard file size.

Optionally, the super client terminal is specifically used for: obtaining an IP list corresponding to the URL from a DNS system; and according to IP addresses of a plurality of CDN servers included in the IP list, downloading all data blocks of the target resource file that satisfy the standard file size.

Optionally, the super client terminal is specifically used for: traversing the IP list and extracting an IP address of each CDN server included in the IP list one by one; sending a HEAD request carrying the URL to the CDN servers corresponding to the IP addresses extracted; and when a file size carried in a received response message responding to the HEAD request is consistent with the standard file size, downloading all the data blocks of the target resource file from the CDN server that sends the response message.

The seventh aspect of the present disclosure provides a system for downloading data blocks of a resource file. The system includes a client terminal as described in the fourth aspect of the present disclosure, a tracker server as described in the fifth aspect of the present disclosure, and super client terminal as described in the sixth aspect of the present disclosure.

The technical solutions of the present disclosure have the following advantages.

In the present disclosure, when a target peer needs to download a target resource file, the target peer may notify a tracker server of a file size and a uniform resource locator (URL) of the target resource file. The tracker server may forward the file size and the URL to a super peer preset in a P2P network to notify the super peer to prepare data blocks that meet the file size and the URL of the target resource file. After the super peer is ready, the tracker server may recommend the super peer to the target peer in a form of a peer list. Then, the target peer may download the data blocks of the target resource file from the super peer. In this way, when the super peer provides the data blocks of the resource file to the target peer, through the file size given by the target peer, the super peer may ensure that the data blocks provided are valid and usable, and belong to a same resource file as data blocks obtained by the target peer through other methods. Accordingly, validity of the resource file downloaded by the target peer may be ensured.

BRIEF DESCRIPTION OF THE DRAWINGS

To explain technical solutions of the present disclosure more clearly, drawings used in description of embodiments of the present disclosure are briefly introduced below. The drawings in the following description are only for some embodiments of the present disclosure. For those of ordinary skills in the art, other drawings may be obtained based on these drawings without creative efforts.

DETAILED DESCRIPTION

To make objectives, technical solutions and advantages of the present disclosure more explicit, embodiments of the present disclosure are described below in detail with reference to accompanying drawings.

Figure 1:
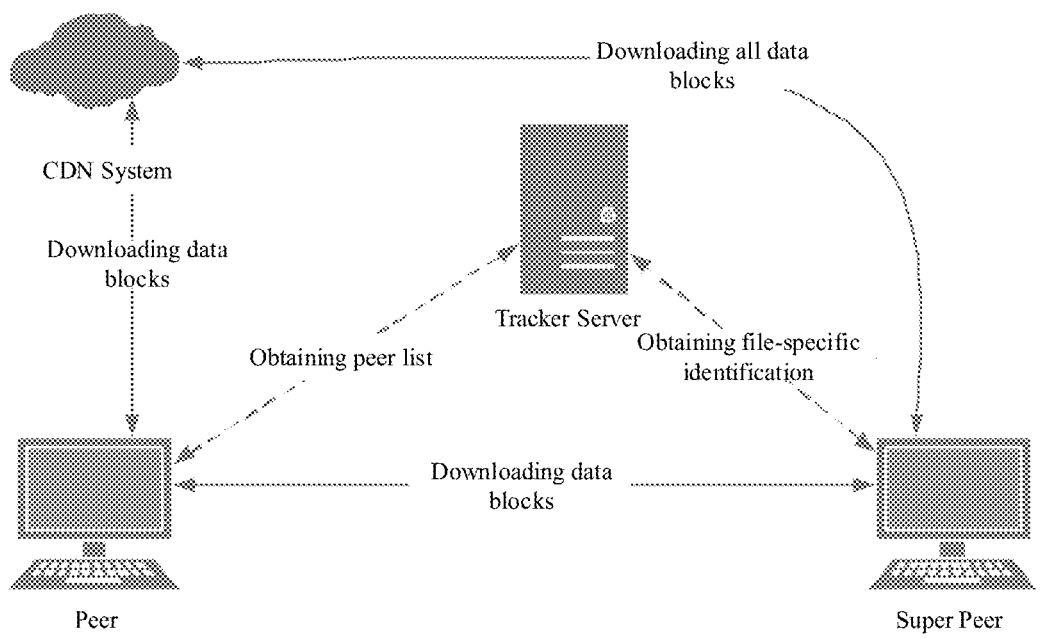
FIG. 1 illustrates a scene frame diagram for downloading data blocks of a resource file according to an embodiment of the present disclosure.

The present disclosure provides a method for downloading data blocks of a resource file. The method may be applied in a peer-to-peer (P2P) network and implemented in combination with a content delivery network (CDN) system and a domain name system (DNS). An exemplary scene framework for implementing the method is shown in FIG. 1. As shown in FIG. 1, the P2P network may include a large number of ordinary peers (that is, client terminals used by users) for downloading a resource file using a P2P technology, and may also include a tracker server set by a CDN service provider and a large number of super peers deployed in a distributed way. The ordinary peers may download data blocks of a resource file from the CDN system, the super peers, and other ordinary peers. The super peers may be used to download data blocks of a resource file from the CDN system and provide the data blocks to the ordinary peers. The tracker server may be used to inform the super peer of requirements for downloading a resource file of the ordinary peer, and provide a peer list to the ordinary peer. A CDN server of the CDN system may store file data of a large number of resource files in a form of a data block set. The DNS system is mainly used to direct a resource file request sent by a peer to an origin site to a designated CDN server. Each of the above network devices may include a processor, a storage device, and a transceiver. The processor may be used to perform a process of downloading data blocks of a resource file as described below. The storage device may be used to store data required and data generated in the process described below. The transceiver may be used to receive and send related data in the process described below.

Figure 2:
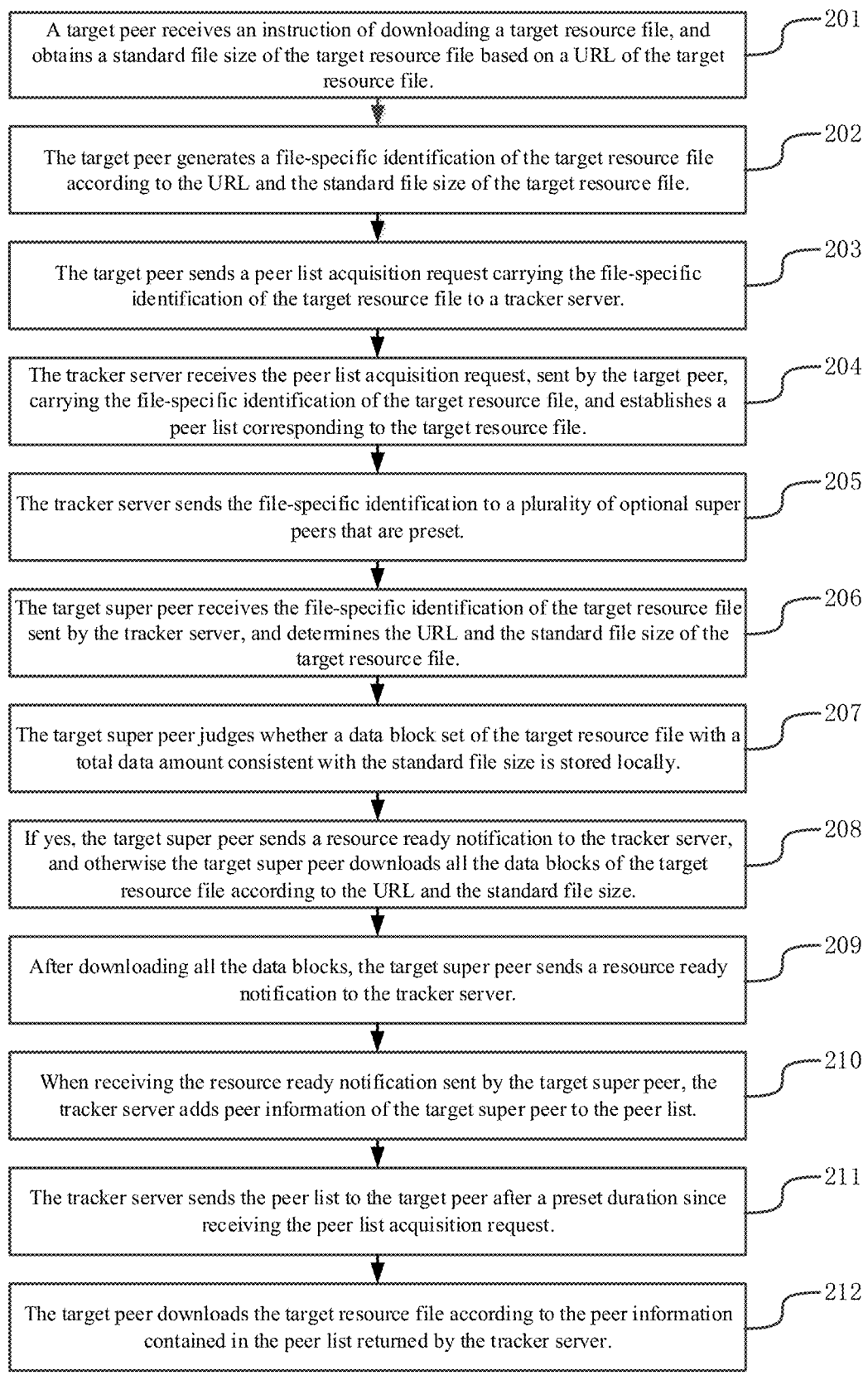
FIG. 2 illustrates a method flowchart for downloading data blocks of a resource file according to an embodiment of the present disclosure.

In combination with specific embodiments, a processing flow shown in FIG. 2 is described below in detail. As shown in FIG. 2, the processing flow may include following 12 steps.

Step 201: A target peer receives an instruction of downloading a target resource file, and obtains a standard file size of the target resource file based on a uniform resource locator (URL) of the target resource file.

Specifically, a user may install a resource downloading application that may download a resource file through a P2P technology on a client terminal. When the client terminal runs the resource downloading application to download a resource file, the client terminal may call a software development kit (SDK) to implement subsequent processing of downloading data blocks of the resource file. The SDK is embedded in the resource download application and provided by the CDN service provider. Specifically, after the client terminal (hereinafter referred to as a target peer) runs the resource downloading application, a resource library interface of the resource downloading application may display a large number of file identifications of resource files that support downloading through the P2P technology. When a user wants to download a resource file (such as a target resource file), the user may click the file identification of the corresponding target resource file. Then the target peer may receive a downloading instruction of the target resource file and obtain a URL of the target resource file from the downloading instruction. After that, the target peer may obtain the standard file size of the target resource file based on the URL of the target resource file.

In one embodiment, the target peer may obtain the standard file size of the resource file from the CDN system through a HEAD request. Correspondingly, processing of obtaining the standard file size in Step 201 may be as follows: the target peer obtains an IP address of the target CDN server from the DNS system based on the URL of the target resource file; the target peer sends a HEAD request carrying the URL to the target CDN server according to the IP address; and the target peer obtains the standard file size of the target resource file carried in a response message of the target CDN server responding the HEAD request.

Specifically, after obtaining the URL of the target resource file from the download instruction of the target resource file, the target peer may query the DNS system for an IP list corresponding to the URL, and select an IP address of a CDN server (may be called a target CDN server) from the IP list. After that, the target peer may send a HEAD request carrying the URL of the target resource file to the target CDN server according to the IP address to query the standard file size of the resource file corresponding to the URL. Afterwards, the target resource file may receive a response message for the HEAD request fed back by the target CDN server, and extract the standard file size of the target resource file carried in the response message.

Step 202: The target peer generates a file-specific identification of the target resource file according to the URL and the standard file size of the target resource file.

Specifically, after obtaining the standard file size of the target resource file, the target peer may generate the file-specific identification of the target resource file according to the standard file size and the URL of the target resource file. For example, the file-specific identification may be "www.xxxx.com/test/123.apk/1024MB", where www.xxxx.com/test/123.apk is the URL, and 1024 MB is the standard file size. In addition, the file-specific identification of the target resource file may also include file information such as a resource provider identification of the target resource file and a version number of the target resource file. For example, if the resource provider identification is yyy, and the version number is 1.0.0, the file-specific identification may be "yyy/www.xxxx. com/test/123.apk/1024MB/1.0.0".

Step 203: The target peer sends a peer list acquisition request carrying the file-specific identification of the target resource file to a tracker server.

Specifically, after generating the file-specific identification of the target resource file, the target peer may send the peer list acquisition request carrying the file-specific identification of the target resource file to the tracker server according to a pre-stored network address of the tracker server.

Step 204: The tracker server receives the peer list acquisition request, sent by the target peer, carrying the file-specific identification of the target resource file, and establishes a peer list corresponding to the target resource file.

Specifically, the tracker server may receive the peer list acquisition request sent by the target peer, and extract the file-specific identification of the target resource file carried in the peer list acquisition request. Meanwhile, the tracker server may establish the peer list corresponding to the target resource file.

In one embodiment, the tracker server may choose an optional super peer based on the IP address of the target peer. Correspondingly, after Step 204, following processing may exist: the tracker server determines the IP address of the target peer based on the peer list acquisition request; and the tracker server determines a plurality of optional super peers responding to the target peer based on the IP address of the target peer.

Specifically, after receiving the peer list acquisition request sent by the target peer, the tracker server may determine the IP address of the target peer based on the peer list acquisition request. After that, based on the IP address of the target peer, the tracker server may select a plurality of optional super peers that may be used for responding to the target peer in the P2P network. The plurality of optional super peers has good network quality with the target peer, for example, the super peer may have a physical location close to the target peer, or the super peer and the target peer are on a same network segment.

In one embodiment, the peer list may include peer information of the ordinary peers storing the data blocks of the target resource file. Correspondingly, after creating the peer list, Step 204 may include following processing: the tracker server determines a plurality of optional ordinary peers that currently store data blocks of the target resource file; and the tracker server adds peer information of the plurality of optional ordinary peers to the peer list.

Specifically, in the P2P network, after downloading the data blocks of the resource file, the ordinary peer may periodically notify the tracker server that the data blocks of the resource file are stored on the ordinary peer. As such, after establishing the peer list corresponding to the target resource file, the tracker server may firstly determine a plurality of optional ordinary peers that currently store the data blocks of the target resource file, and then add the peer information of the plurality of optional ordinary peers to the peer list. It is worth mentioning that processing of the tracker server in determining the optional ordinary peers may be referred to processing of the tracker server in determining the optional super peers described above, which is not repeated here.

Step 205: The tracker server sends the file-specific identification to a plurality of optional super peers that are preset.

Specifically, after obtaining the file-specific identification of the target resource file, the tracker server may first determine a plurality of optional super peers among the super peers that are preset in the P2P network, and then distribute the file-specific identification to each of the plurality of optional super peer.

Step 206: The target super peer receives the file-specific identification of the target resource file sent by the tracker server, and determines the URL and the standard file size of the target resource file.

Specifically, during an operation process, if the target super peer receives the file-specific identification of the target resource file sent by the tracker server, the target super peer may parse the file-specific identification to obtain the URL and the standard file size of the target resource file.

Step 207: The target super peer judges whether a data block set of the target resource file with a total data amount consistent with the standard file size is stored locally.

Specifically, after parsing out the URL and the standard file size of the target resource file, the target super peer may determine whether a data block set of the target resource file with a total data amount consistent with the standard file size is stored locally. It may be understood that the total data amount of the data block set is a total data amount of all the data blocks of the target resource file. For a same resource file, the standard file size should be equal to the total data amount of all the data blocks.

In one embodiment, processing of the target super peer in determining a storage status of the data block set of the target resource file may be as follows: the target super peer determines whether the data block set corresponding to the URL is stored locally; and if yes, the target super peer judges whether the total data amount of the data block set is consistent with the standard file size.

Specifically, after parsing out the URL and the standard file size of the target resource file, the target super peer may use the URL to determine whether the data block set corresponding to the URL is stored locally; and if yes, the target super peer may further determine whether the total data amount of the data block set is consistent with the standard file size.

Step 208: If yes, the target super peer sends a resource ready notification to the tracker server, and otherwise the target super peer downloads all the data blocks of the target resource file according to the URL and the standard file size.

Specifically, if the data block set of the target resource file with a total data amount consistent with the standard file size is stored locally, the target super peer may send the resource ready notification for the target resource file to the tracker server. If no data blocks of the target resource file are stored locally, or a total data amount of the data block set of the target resource file locally stored is not consistent with the standard file size, the target super peer may download all the data blocks of the target resource file according to the URL and the standard file size parsed out from the file-specific identification of the target resource file.

In one embodiment, the target super peer may download all the data blocks of the target resource file that meet the standard file size in a plurality of CDN servers. Correspondingly, processing of downloading the data blocks in Step 208 may be as follows: the target super peer obtains the IP list corresponding to the URL from the DNS system; and according to IP addresses of a plurality of CDN servers included in the IP list, the target super peer downloads all the data blocks of the target resource file that meet the standard file size.

Specifically, if the target super peer does not store the data block set of the target resource file with a total data amount consistent with the standard file size, the target super peer may obtain the IP list corresponding to the URL of the target resource file from the DNS system first. The IP list may include IP addresses of a plurality of CDN servers, and each CDN server may provide a data block downloading service of the target resource file. After that, according to the IP addresses of the plurality of CDN servers, the target super peer may download all the data blocks of the target resource file that meet the standard file size.

In one embodiment, the target super peer may query file sizes of target resource files stored at the plurality of CDN servers one by one to ensure that the downloaded data blocks meet the standard file size. Correspondingly, processing of downloading all data blocks of the target resource file may be as follows: the target super peer traverses the IP list and extracts the IP address of each CDN server included in the IP list one by one; the target super peer sends a HEAD request carrying the URL to the CDN server corresponding to the extracted IP address; when the file size carried in the received response message for the HEAD request is consistent with the standard file size, the target super peer downloads all the data blocks of the target resource file from the CDN server sending the response message.

Specifically, after the target super peer obtains the IP list corresponding to the URL from the DNS system, the target super peer may traverse the IP list and extract the IP address of each CDN server included in the IP list one by one. For each extracted IP address, the target super peer may send a HEAD request carrying the URL of the target resource file to the CDN server corresponding to the IP address to query a file length of the resource file corresponding to the URL on the CDN server. In this way, after receiving the response message from the CDN server for the HEAD request, the target super peer may determine whether a file size carried in the response message is consistent with the standard file size of the target resource file. If not consistent, the target super peer may send the HEAD request to a CDN server corresponding to a next IP address and perform subsequent processing until the file size carried in the response message returned by the CDN server is consistent with the standard file size of the target resource file. When the file size carried in the response message is consistent with the standard file size of the target resource file, the target super peer may download all the data blocks of the target resource file from the CDN server that sent the response message.

Step 209: After downloading all the data blocks, the target super peer sends a resource ready notification to the tracker server.

Specifically, after the target super peer downloads all the data blocks of the target resource file, the target super peer may send a resource ready notification for the target resource file to the tracker server. It is not difficult to understand that in a process of downloading the data blocks of the target resource file, the target super peer may determine whether all the data blocks of the target resource file have been downloaded according to the total data amount of all data blocks that have been downloaded and the standard file size.

Step 210: When receiving the resource ready notification sent by the target super peer, the tracker server adds peer information of the target super peer to the peer list.

Specifically, after the tracker server sends the file-specific identification to the plurality of optional super peers, when receiving the resource ready notification for the target resource file sent by the target super peer, the tracker server may add the peer information of the target super peer to the peer list corresponding to the target resource file. The target super peer here may be any one or more of the plurality of optional super peers.

Step 211: The tracker server sends the peer list to the target peer after a preset duration since receiving the peer list acquisition request.

Specifically, the tracker server may send the peer list corresponding to the target resource file to the target peer after the preset time since receiving the peer list acquisition request sent by the target peer.

Step 212: The target peer downloads the target resource file according to the peer information contained in the peer list returned by the tracker server.

Specifically, the target peer may receive the peer list from the tracker server responding to the peer list acquisition request, extract the peer information contained in the peer list, and then download the target resource file based on the peer information. Specifically, the target peer may establish a connection with each of the peers (including ordinary peers and/or super peers) corresponding to the peer information in the peer list, and download data blocks of the target resource file from these peers. During a downloading process, the target peer may dynamically adjust the downloading process of the target resource file according to download rates. That is, the target peer may disconnect a connection with a slow or unresponsive peer, establish a connection with a new peer, reduce or cancel data block requests to peers with low download rates, and request more data blocks from peers with high download rates.

It should be noted that before the target resource file is completely downloaded, the target peer may periodically send the peer list acquisition request to the tracker server. After the tracker server sends the peer list to the target peer, if the tracker server receives a resource ready notification of a new super peer, the tracker server may add the peer information of the new super peer to the peer list. In this way, when receiving the peer list acquisition request for the target resource file sent by the target peer again, the tracker server may feed back the latest peer list to the target peer after the preset duration.

In one embodiment, the target peer may generate bitmap information from the standard file size, and download the target resource file according to the bitmap information. Correspondingly, processing of downloading the target resource file in Step 212 may be as follows: the target peer obtains the bitmap information of the target resource file according to the standard file size and a preset data block size of the target resource file; and the target peer downloads the data blocks of the target resource file according to the bitmap information of the target resource file.

Specifically, before downloading the data blocks of the target resource file, the target peer may calculate the bitmap information of the target resource file according to the standard file size and the preset data block size of the target resource file. The bitmap information may include the number of data blocks of the target resource file and data contents corresponding to each data block. After that, the target peer may download the data blocks of the target resource file according to the bitmap information of the target resource file and the peer information contained in the peer list.

In one embodiment, when the target peer downloads the data blocks of the resource file from the peers, the target peer may simultaneously download the data blocks of the resource file from the CDN system. Correspondingly, after the target peer obtains the bitmap information, following processing may also exist: the target peer downloads the data blocks of the target resource file from the CDN system according to the bitmap information and the URL of the target resource file.

Specifically, after the target peer calculates the bitmap information of the target resource file, when downloading the data blocks of the target resource file through other peers of the P2P network, the target peer may simultaneously download the data blocks of the target resource file from the CDN servers in the CDN system according to the URL and the bitmap information of the target resource file.

In one embodiment, the tracker server may create an ordinary peer list and a super peer list respectively for the ordinary peers and the super peers. The ordinary peer list may be used to store the peer information of the ordinary peers, and the super peer list may be used to store the peer information of the super peers. Correspondingly, when the tracker server feeds back the peer list corresponding to the target resource file to the target peer, the tracker server may feed back both the ordinary peer list and the super peer list. When the target peer downloads the data blocks of the target resource file according to the peer list, the target peer may preferentially use the peer information of the super peers in the super peer list, establish connection with the super peers, and download the corresponding data blocks from the super peers.

In the present disclosure, when a target peer needs to download a target resource file, the target peer may notify a tracker server of a file size and a URL of the target resource file. The tracker server may forward the file size and the URL to a super peer preset in a P2P network to notify the super peer to prepare data blocks that meet the file size and the URL of the target resource file. After the super peer is ready, the tracker server may recommend the super peer to the target peer in a form of a peer list. Then, the target peer may download the data blocks of the target resource file from the super peer. In this way, when the super peer provides the data blocks of the resource file to the target peer, through the file size given by the target peer, the super peer may ensure that the data blocks provided are valid and usable, and belong to a same resource file as data blocks obtained by the target peer through other methods. Accordingly, validity of the resource file downloaded by the target peer may be ensured.

Based on the same technical conception, the present disclosure also provides a client terminal for downloading data blocks of a resource file. The client terminal may be used for receiving an instruction of downloading a target resource file and obtaining a standard file size of the target resource file based on a URL of the target resource file; generating a file-specific identification of the target resource file according to the URL and the standard file size of the target resource file; sending a peer list acquisition request carrying the file-specific identification of the target resource file to a tracker server; and downloading the target resource file according to peer information contained in a peer list fed back by the tracker server.

In one embodiment, the client terminal is specifically used for obtaining an IP address of a target CDN server from a DNS system based on the URL of the target resource file; sending a HEAD request carrying the URL to the target CDN server according to the IP address; and obtaining a standard file size of the target resource file carried in a response message of the target CDN server for the HEAD request.

In one embodiment, the client terminal is specifically used for obtaining bitmap information of the target resource file according to the standard file size and a preset data block size of the target resource file; and downloading data blocks of the target resource file according to the bitmap information of the target resource file.

In one embodiment, the client terminal is also used for downloading the data blocks of the target resource file from the CDN system according to the bitmap information and the URL of the target resource file.

Based on the same technical conception, the present disclosure also provides a tracker server for downloading data blocks of a resource file. The tracker server may be used for receiving a peer list acquisition request carrying a file-specific identification of a target resource file and sent by a target peer, and establishing a peer list corresponding to the target resource file. The file-specific identification includes a URL and a standard file size of the target resource file. The tracker server may be also used for sending the file-specific identification to a plurality of preset optional super peers, such that the optional super peers may download a data block set corresponding to the file specific identification; when receiving a resource ready notification sent by the target super peer, adding peer information of the target super peer to the peer list; and after a preset duration since receiving the peer list acquisition request, sending the peer list to the target peer.

In one embodiment, the tracker server is also used for determining an IP address of the target peer according to the peer list acquisition request; and based on the IP address of the target peer, determining a plurality of optional super peers that respond to the target peer.

In one embodiment, the tracker server is also used for determining a plurality of optional ordinary peers currently storing data blocks of the target resource file; and adding peer information of the plurality of optional ordinary peers to the peer list.

In one embodiment, the peer list includes an ordinary peer list for storing peer information of the ordinary peers and a super peer list for storing peer information of the super peers.

Based on the same technical conception, the present disclosure also provides a super client terminal for downloading data blocks of a resource file. The super client terminal may be used for receiving a file-specific identification of a target resource file sent by a tracker server, and determining a URL and a standard file size of the target resource file; judging whether a data block set of the target resource file with a total data amount consistent with the standard file size is locally stored; if yes, sending a resource ready notification to the tracker server, otherwise downloading all data blocks of the target resource file according to the URL and the standard file size; and after downloading all the data blocks, sending a resource ready notification to the tracker server.

In one embodiment, the super client terminal is specifically used for judging whether a data block set corresponding to the URL is stored locally; and if yes, judging whether a total data amount of the data block set is consistent with the standard file size.

In one embodiment, the super client terminal is specifically used for obtaining an IP list corresponding to the URL from a DNS system; and downloading all data blocks of the target resource file that satisfy the standard file size according to IP addresses of a plurality of CDN servers included in the IP list.

In one embodiment, the super client terminal is specifically used for traversing the IP list and extracting an IP address of each CDN server included in the IP list one by one; sending a HEAD request carrying the URL to the CDN server corresponding to the extracted IP address; and when a file size carried in a received response message for the HEAD request is consistent with the standard file size, downloading all data blocks of the target resource file from the CDN server that sends the response message.

Based on the same technical conception, the present disclosure also provides a system for downloading data blocks of a resource file. The system includes a client terminal, a tracker server, and a super client terminal. For functions of the client terminal, the tracker server, and the super client terminal, reference may be made to Step 201 to Step 212 described in the present disclosure.

Those of ordinary skills in the art may understand that all or part of steps for implementing the embodiments of the present disclosure may be completed by hardware or may be completed by instructing related hardware through a program. The program may be stored in a computer-readable storage medium. The storage medium may be a read-only memory, a magnetic disk, an optical disk, or the like.

The embodiments disclosed in the present disclosure are exemplary only and not limiting the scope of the present disclosure. Without departing from the spirit and principle of the present disclosure, any modification, equivalent replacement, or improvement are intended to be encompassed within the scope of the present disclosure.

What is claimed is:

1. A method for downloading data blocks of a resource file, the method comprising:
   receiving, by a target peer, an instruction of downloading a target resource file, and obtaining, by the target peer, a standard file size of the target resource file based on a URL of the target resource file;
   according to the URL and the standard file size of the target resource file, generating, by the target peer, a file-specific identification of the target resource file;
   sending, by the target peer, a peer list acquisition request carrying the file-specific identification of the target resource file to a tracker server; and
   according to peer information contained in a peer list fed back from the tracker server, downloading, by the target peer, the target resource file.

2. The method according to claim 1, wherein the obtaining, by the target peer, the standard file size of the target resource file based on the URL of the target resource file comprises:
   based on the URL of the target resource file, obtaining, by the target peer, an IP address of a target CDN server from a DNS system;
   according to the IP address, sending, by the target peer, a HEAD request carrying the URL to the target CDN server; and
   obtaining, by the target peer, the standard file size of the target resource file carried in a response message of the target CDN server responding the HEAD request.

3. The method according to claim 1, wherein the downloading, by the target peer, the target resource file comprises:
   according to the standard file size and a preset data block size of the target resource file, obtaining, by the target peer, bitmap information of the target resource file; and
   according to the bitmap information of the target resource file, downloading, by the target peer, data blocks of the target resource file.

4. The method according to claim 3, after the obtaining, by the target peer, the bitmap information of the target resource file, further comprising:
   according to the bitmap information and the URL of the target resource file, downloading, by the target peer, the data blocks of the target resource file from a CDN system.

5. The method according to claim 1, wherein:
   before the target resource file is completely downloaded, the target peer periodically sends the peer list acquisition request to the tracker server; and
   according to the peer information contained in a latest peer list fed back from the tracker server, the target peer completely downloads the target resource file.

6. The method according to claim 1, wherein:
   during a process of downloading the target resource file, the target peer disconnects a connection with a slow or unresponsive peer, establish a connection with a new peer, reduce or cancel data block requests to peers with low downloading rates, or request more data blocks from peers with high downloading rates.

7. A method for downloading data blocks of a resource file, the method comprising:
   receiving, by a tracker server, a peer list acquisition request, sent by a target peer, carrying a file-specific identification of a target resource file, and establishing, by the tracker server, a peer list corresponding to the target resource file, wherein the file-specific identification includes a URL and a standard file size of the target resource file;
   sending, by the tracker server, the file-specific identification to a plurality of optional super peers that are preset, for the plurality of optional super peers to download a data block set corresponding to the file-specific identification;
   when receiving a resource ready notification sent by a target super peer, adding, by the tracker server, peer information of the target super peer to the peer list; and
   after a preset duration since receiving the peer list acquisition request, sending, by the tracker server, the peer list to the target peer.

8. The method according to claim 7, after the receiving, by the tracker server, the peer list acquisition request, sent by the target peer, carrying the file-specific identification of the target resource file, further comprising:
   according to the peer list acquisition request, determining, by the tracker server, an IP address of the target peer; and
   based on the IP address of the target peer, determining, by the tracker server, the plurality of optional super peers that respond to the target peer.

9. The method according to claim 8, wherein:
   the plurality of optional super peers, that respond to the target peer, have a physical location close to the target peer and/or are on a same network segment with the target peer.

10. The method according to claim 7, after the establishing, by the tracker server, the peer list corresponding to the target resource file, further comprising:
- determining, by the tracker server, a plurality of optional ordinary peers currently storing data blocks of the target resource file; and
- adding, by the tracker server, peer information of the plurality of optional ordinary peers to the peer list.

11. The method according to claim 7, wherein the peer list includes an ordinary peer list for storing peer information of the ordinary peers and a super peer list for storing peer information of the super peers.

12. The method according to claim 11, wherein:
- when downloading the target resource file according to the peer list, the target peer uses the peer information of the super peers in the super peer list, establishes connections with the super peers, and downloads data blocks from the super peers.

13. A method for downloading data blocks of a resource file, the method comprising:
- receiving, by a target super peer, a file-specific identification of a target resource file sent by a tracker server, and determining, by the target super peer, a URL and a standard file size of the target resource file;
- judging, by the target super peer, whether a data block set of the target resource file with a total data amount consistent with the standard file size is locally stored;
- if yes, sending, by the target super peer, a resource ready notification to the tracker server, otherwise, downloading, by the target super peer, all data blocks of the target resource file according to the URL and the standard file size; and
- after downloading all the data blocks, sending, by the target super peer, the resource ready notification to the tracker server.

14. The method according to claim 13, wherein the judging, by the target super peer, whether the data block set of the target resource file with the total data amount consistent with the standard file size is locally stored comprises:
- judging, by the target super peer, whether a data block set corresponding to the URL is stored locally; and
- if yes, judging, by the target super peer, whether a total data amount of the data block set is consistent with the standard file size.

15. The method according to claim 14, wherein:
the total data amount of the data block set is a total data amount of all data blocks of the data block set.

16. The method according to claim 14, wherein:
when no data blocks of the target resource file are stored locally, or the total data amount of the data block set of the target resource file locally stored is inconsistent with the standard file size, the target super peer downloads all the data blocks of the target resource file according to the URL and the standard file size of the target resource file.

17. The method according to claim 13, wherein the downloading, by the target super peer, all the data blocks of the target resource file according to the URL and the standard file size comprises:
- obtaining, by the target super peer, an IP list corresponding to the URL from a DNS system; and
- downloading, by the target super peer, all the data blocks of the target resource file that satisfy the standard file size according to IP addresses of a plurality of CDN servers included in the IP list.

18. The method according to claim 17, wherein downloading, by the target super peer, all the data blocks of the target resource file that satisfy the standard file size according to the IP addresses of the plurality of CDN servers included in the IP list comprises:
- traversing, by the target super peer, the IP list, and extracting, by the target super peer, the IP address of each CDN server included in the IP list one by one;
- sending, by the target super peer, a HEAD request carrying the URL to the CDN server corresponding to the IP address extracted; and
- when a file size carried in a received response message responding to the HEAD request is consistent with the standard file size, downloading, by the target super peer, all the data blocks of the target resource file from the CDN server that sends the response message.

19. The method according to claim 18, wherein:
when the file size carried in the received response message is inconsistent with the standard file size of the target resource file, the target super peer sends the HEAD request to a CDN server corresponding to a next IP address until the file size carried in the received response message returned by the CDN server is consistent with the standard file size of the target resource file.

20. The method according to claim 13, wherein:
when a total data amount of data blocks that are downloaded is consistent with the standard file size, the target super peer determines that the all data blocks of the target resource file have been downloaded.

* * * * *